Jan. 7, 1936. L. KIRSCHBRAUN Re. 19,818
PROCESS FOR TREATING HYDROCARBONS
Original Filed Nov. 1, 1922
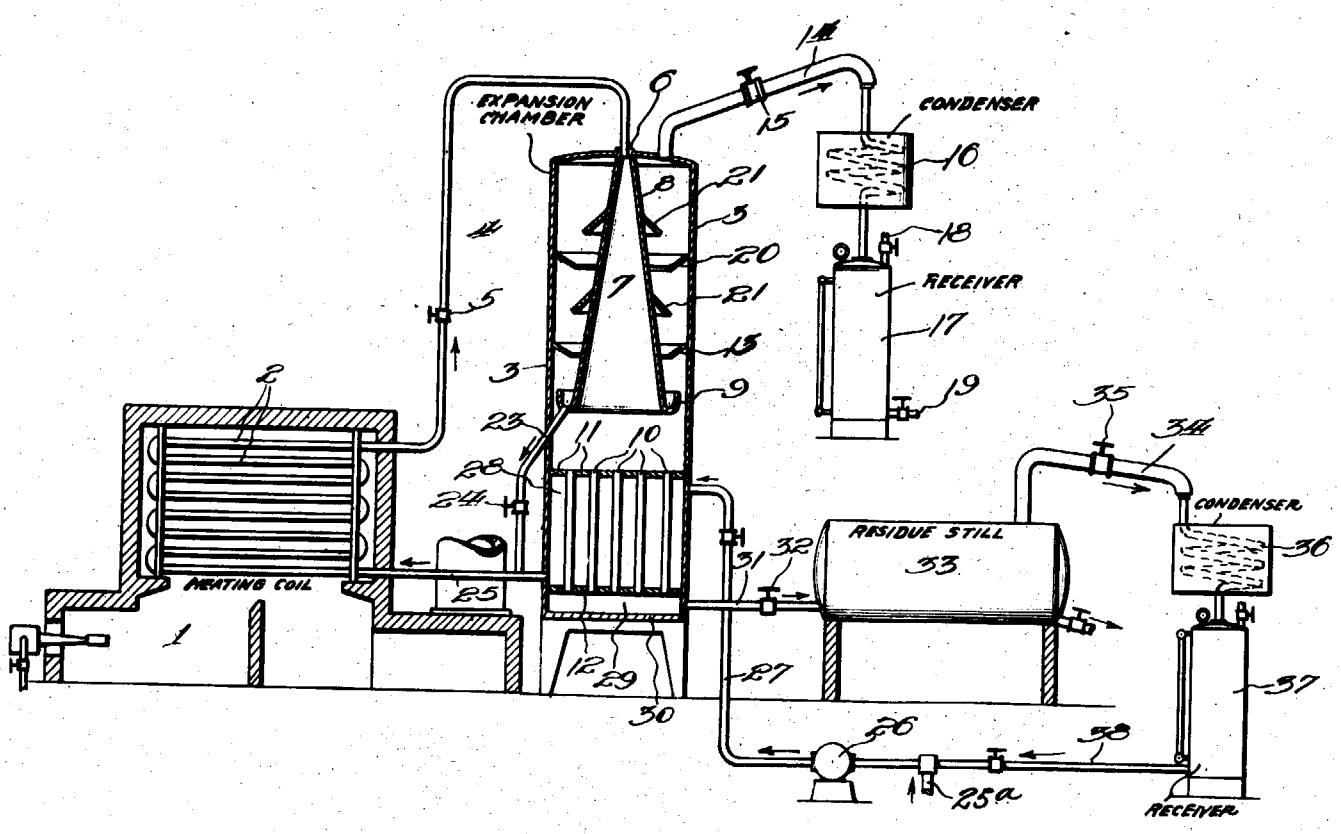
Witness:
Stephen T. Kehoe
Inventor:
Lester Kirschbraun
by Frank L. Belknap Atty.

Reissued Jan. 7, 1936 Re. 19,818

UNITED STATES PATENT OFFICE 19,818

PROCESS FOR TREATING HYDROCARBONS

Lester Kirschbraun, Leonia, N. J., assignor to Universal Oil Products Company, Chicago, Ill., a corporation of South Dakota Original No. 1,824,215, dated September 22, 1931, Serial No. 598,248, November 1, 1922. Renewed November 25, 1929. Application for reissue September 15, 1932, Serial No. 633,372

19 Claims. (Cl. 196—49)

This invention relates to improvements in a process for treating hydrocarbons and relates more particularly and has for its object to provide an effective and economical method for cracking petroleum oil.

The single figure of the drawing is a more or less diagrammatic side elevational view of my apparatus, said elevation being in vertical section.

Referring in detail to the drawing, in the furnace 1 is mounted the heating coil 2, which may take the form of an endless coil of say, 3" pipe. This coil is connected to the upper end of an expansion chamber 3 by means of the transfer line 4 in which is interposed a throttle valve 5. The transfer line 4 is connected as shown at 6 to the upper end of the expansion chamber and there the heated oil is delivered into the conical chamber 7, formed by the conical shell 8, the arrangement being such that the shell 8, which is shown, opens outwardly towards its lower end and the velocity of the vapors is reduced as they pass from the top of the expansion chamber 3 to the lower end thereof. The lower end of this suspended conical shell 8 is provided with an upturned rim 9 forming a channel portion. As the oil passes down through the chamber 8, the residue or unvaporized portions will drop out and fall through the open-ended flues or tubes 10 supported between the plates 11 and 12. The vapors will pass up around the channel 9 and inclined circumferentially extending baffles 13, 20 and 21 and then out through the vapor pipe 14 having a throttle valve 15 to the condenser coil 16 and thence to the receiving drum 17, which drum 17 is provided with gas outlet valve 18 and distillate drawoff valve 19.

The heavier vapors will condense in the upper part of the expansion chamber 3 outside of the cone, provided with the baffles 20 and 21 and the aerial condenser pipe 14 (there may be a plurality of these if desired), or any other suitable form of aerial condenser used. The reflux condensate will be caught in the channel 9, drawn off through the pipe 23 having throttle valve 24 to the pipe 25, which is connected to the inlet side of the heating coil 2. This reflux condensate, of course, will be relatively hot.

The raw oil to be treated comes from any suitable source of supply through pump 26 and feed line 27 into the chamber 28 formed by the partition plates 11 and 12 hereinbefore referred to. The raw oil passes through this chamber 28 and around the series of tubes 10, thereby cooling the residue and simultaneously preheating the oil. The cooled residue will be drawn off through the chamber 29 formed by the plate 12 and bottom plate 30 and thence by residue drawoff pipe 31, having valve 32 to a still 33, which may or may not be heated. It is contemplated that in the still 33, the pressure, if desired, may be materially reduced relative to the pressure in the expansion chamber 3, which will permit the residue to readily distill because of the reduction of pressure. The vapors may then pass out through vapor pipe 34 having throttle valve 35 to condenser coil 36 and thence to receiver 37. Here the distillate, collected in receiver 37, may be drawn off through pipe 38 back to the pump 26, and can be rerun through the system.

In carrying out the process, the pressure on the heating coil, expansion chamber and receiver 17 may be say, 200 pounds, and the pressure on the still 33 reduced to say, 50 pounds. The oil may be heated to a temperature in the coil of say, 800 degs. F. Or the invention may be carried out by having a pressure of say, 300 pounds on the heating coil 2, 200 pounds on the expansion chamber 3, and 50 pounds on the still 33. In this case a pump should be introduced into the line 23 to force the hot reflux condensate back into the coil 2 or such reflux condensate may be taken elsewhere to be treated or such reflux condensate may be delivered into the still 33, by closing valve 24 thus obviating the necessity of a pump.

In its broader aspects, the invention is not limited to the particular place from which the reflux condensate is drawn or any particular pressure on any part of the apparatus except that it would be desirable to have a higher pressure on the expansion chamber 3 than on the still 33. As a result of the process and apparatus here shown, less difficulty with carbon will be encountered, thus permitting a greater percentage of the oil to be taken over as pressure distillate and also reducing to a minimum the precipitation of carbon in the reaction zone. This results from the fact that the oil going down through the cone referred to, more or less in the form of a spray, finds no place on which to deposit the carbon containing tar until the tar meets the upper end of the relatively cold tubes. Here the tar passes through these tubes and is immediately reduced in temperature sufficiently to prevent further decomposition; then flows into the lower chamber 29 and is immediately drawn out of the system. It is to be understood that there is a whole nest of these tubes, probably, for example, several hundred—sufficient to insure a maximum surface opening in the upper plate while at the same time allowing sufficient space between the tubes for the crude oil to pass by and cool them. The arrangement is preferably such as to reduce to a minimum the horizontal surface on which any carbon might deposit and to insure any liquid tar immediately flowing out.

With reference to the residue which is cooled in passing through the tubes 10, it is advantageous to prevent the collection of any substantial accumulation of heated liquid in these tubes, and the cooled residue should be transferred out of the chamber 29 as soon as possible. This, of course, can be governed somewhat by the size and length of the cooling tubes, which cooling tubes may be from 1'' or 2'' in diameter to say, 6'' or more, and the length of the tubes from a few feet to 8' or 10' or more. It is to be understood that the size of the tubes will depend on the general construction of the apparatus. It is understood that the apparatus should be equipped with the usual manholes and other means for cleaning and the usual pyrometers, pressure gauges and safety valves.

I claim as my invention:

1. A continuous process for cracking hydrocarbon oil, consisting in raising the oil to a cracking temperature while flowing in a restricted stream through a heating zone, in delivering the heated oil to an enlarged reaction zone, through which the oil is caused to flow downwardly and undergo substantial vaporization, in causing vapors released from the oil during the downward flow of the oil to rise in an annular stream through said reaction zone, while out of contact with the downflowing oil, in collecting condensate separated from the vapors rising in said annular stream and in removing the same from said reaction zone, without permitting the same to contact with unvaporized oil therein, and in returning such condensate to said heating zone, in taking off uncondensed vapors from said reaction zone and in subjecting the same to condensation, and in collecting the resulting distillate.

2. A continuous process for cracking hydrocarbon oil, consisting in raising the oil to a cracking heat while advancing in a restricted stream through a heating zone, in introducing the heated oil to the top of an enlarged reaction zone, to flow downwardly through the central portion thereof, in passing vapors released from the oil in said reaction zone upwardly through the reaction zone in an annular stream, out of contact with the downflowing oil, in collecting condensate separated from the vapors in said annular stream and in removing such condensate from said reaction zone, without permitting the same to commingle with unvaporized oil in the reaction zone, in passing a stream of charging oil in heat interchange relationship with unvaporized oil in said reaction zone and in subsequently uniting the charging oil with the condensate which has been removed from the reaction zone, and in supplying the resulting commingled oils to said heating zone, to form the stream advancing therethrough.

3. In processes for cracking high boiling point oils to produce low boiling point oils in which the oil is subjected to pressure distillation in a pressure distillation zone, the pressure distillation zone comprising heating and reaction zones, the oil being passed first through the heating zone and thence delivered to the reaction zone, vapors and unvaporized oil separately removed from the reaction zone, the vapors subjected to reflux condensation to separate insufficiently cracking fractions, the improvement which comprises precluding the accumulation of unvaporized residue in the reaction zone by removing the residue therefrom as rapidly as formed, cooling the residue as it is removed from the reaction zone while under pressure, thence delivering the residue to a zone of lower pressure wherein distillation of the residue is effected at the temperature to which said residue has been cooled, and returning products obtained by said distillation of the residue to said pressure distillation zone.

4. In processes for cracking high boiling point oils to produce low boiling point oils in which the oil is subjected to pressure distillation in a pressure distillation zone, the pressure distillation zone comprising heating and reaction zones, the oil being passed first through the heating zone and thence delivered to the reaction zone, vapors and unvaporized oil separately removed from the reaction zone, the vapors subjected to reflux condensation to separate insufficiently cracked fractions, the improvement which comprises precluding the accumulation of unvaporized residue in the reaction zone by removing the residue therefrom as rapidly as formed, cooling the residue as it is removed from the reaction zone while under pressure by heat exchange with incoming charging oil for the process, thence delivering the residue to a zone of lower pressure wherein distillation of the residue is effected at the temperature to which said residue has been cooled, and returning products obtained by said distillation of the residue to said pressure distillation zone.

5. The process of cracking petroleum oils which comprises continuously passing the oil in a restricted stream through a zone wherein the oil is heated to a cracking temperature, thence delivering this restricted stream of oil constituents into a reaction zone, continuously removing vapors, and liquid oil from said reaction zone without permitting the liquid oil so removed to mingle with the oil of said restricted stream, effecting the removal of the liquid oil at a rate adequate to prevent during normal operation of the process the accumulation of any appreciable body of oil in such reaction zone, subjecting the vapors evolved from the oil to reflux condensation, returning reflux condensate thus derived to said restricted stream, maintaining a substantial superatmospheric pressure on the oil in said restricted stream and reaction zone, partially cooling the liquid oil removed from said reaction zone to prevent further decomposition and vaporizing from the removed oil by its contained heat a recycle stock by effecting distillation thereof in a zone maintained under lower pressure than said reaction zone, and returning the recycle stock to the cracking process.

6. The process of cracking petroleum oils which comprises continuously passing the oil in a restricted stream through a zone wherein the oil is heated to a cracking temperature, thence delivering this restricted stream of oil constituents into a reaction zone, continuously removing vapors, and liquid oil from said reaction zone without permitting the liquid oil so removed to mingle with the oil of said restricted stream, effecting the removal of the liquid oil at a rate adequate to prevent during normal operation of the process the accumulation of any appreciable body of oil in such reaction zone, maintaining a substantial superatmospheric pressure on the oil in said restricted stream and reaction zone, partially cooling the liquid oil removed from said reaction zone to prevent further decomposition and vaporizing from the removed oil by its contained heat a recycle stock by effecting distillation thereof in a zone maintained under lower pressure than said reaction zone, and returning the recycle stock to the cracking process.

7. A process of cracking hydrocarbon oil which comprises heating the oil to cracking temperature as it flows under superatmospheric pressure through a heated coil, passing the oil thence into an enlarged reaction chamber maintained under superatmospheric pressure wherein separation of vapors and liquid occurs, removing the separated vapors, withdrawing liquid from said enlarged chamber at a rate adequate to prevent accumulation of liquid therein and expanding the liquid thus withdrawn directly into a flash chamber and effecting distillation by means of the contained heat of said liquid under reduced pressure.

8. A process of cracking hydrocarbon oil which comprises subjecting the oil to cracking temperature under superatmospheric pressure as it flows through a heated coil, passing the oil thence into an enlarged reaction chamber wherein without any material reduction in pressure separation of vapors and liquid occurs, removing the separated vapors, withdrawing liquid from said enlarged chamber at a rate adequate to prevent accumulation of liquid therein and expanding the liquid thus withdrawn directly into a flash chamber and effecting distillation by means of the contained heat of said liquid under reduced pressure.

9. A process of cracking hydrocarbon oil wherein the oil is raised to a cracking temperature as it flows through a heated coil, is passed thence into an enlarged reaction chamber from which vapors and liquid are separately removed and return of the latter to said coil prevented and the vapors subjected to fractionation to form a condensate which is returned to the heating coil, the process that comprises withdrawing the liquid from said enlarged reaction chamber at a rate adequate to prevent accumulation of liquid therein and expanding the liquid thus withdrawn directly into a flash chamber and effecting distillation by means of the contained heat of said liquid under reduced pressure.

10. A process of cracking hydrocarbon oil which comprises heating the oil to cracking temperature as it flows under superatmospheric pressure through a heated coil introducing the heated oil into the top of an enlarged reaction chamber maintained under superatmospheric pressure wherein separation of vapors and liquid occurs, removing the separated vapors, withdrawing the precipitated liquid from the bottom of said enlarged chamber at a point remote from that of the introduction of the oil to the chamber and at a rate adequate to prevent accumulation of liquid therein and expanding the liquid thus withdrawn directly into a flash chamber and effecting distillation by means of the contained heat of said liquid under reduced pressure.

11. A process of cracking hydrocarbon oil which comprises heating the oil to cracking temperature as it flows under superatmospheric pressure through a heated coil, passing the oil thence into an enlarged reaction chamber maintained under superatmospheric pressure wherein separation of vapors and liquid occurs, removing the separated vapors withdrawing liquid from said enlarged chamber at a rate adequate to prevent accumulation of liquid therein and expanding the liquid thus withdrawn into a flash chamber and effecting distillation by means of the contained heat of said liquid under reduced pressure.

12. A process of cracking hydrocarbon oil which comprises subjecting the oil to cracking temperature under superatmospheric pressure as it flows through a heated coil, passing the oil thence into an enlarged reaction chamber wherein without any material reduction in pressure separation of vapors and liquid occurs, removing the separated vapors, withdrawing liquid from said enlarged chamber at a rate adequate to prevent accumulation of liquid therein and expanding the liquid thus withdrawn into a flash chamber and effecting distillation by means of the contained heat of said liquid under reduced pressure.

13. A process of cracking hydrocarbon oil wherein the oil is raised to a cracking temperature as it flows through a heated coil, is passed thence into an enlarged reaction chamber from which vapors and liquids are separately removed and return of the latter to said coil prevented and the vapors subjected to fractionation to form a condensate which is returned to the heating coil, the process that comprises withdrawing the liquid from said enlarged reaction chamber at a rate adequate to prevent accumulation of liquid therein and expanding the liquid thus withdrawn into a flash chamber and effecting distillation by means of the contained heat of the liquid under reduced pressure.

14. A process of cracking oil which comprises heating hydrocarbon oil to cracking temperature under pressure in a long heating coil to heat the oil extensively while flowing the oil through said coil at a rapid rate, passing the heated oil into the upper portion of an enlarged zone to effect the separation of the light cracked products by distillation, removing the separated vapors, separately withdrawing the liquid from said enlarged zone at a rate adequate to prevent accumulation of substantially any oil therein, stripping the lighter fractions of the discharged residual oil by suddenly expanding it at low pressure into a flash chamber where substantial vaporization by its contained heat takes place and withdrawing residual oil from the bottom of said flash chamber.

15. A process of cracking oil which comprises charging a stream of hydrocarbon oil once through a cracking coil maintained under cracking temperature and pressure, curtailing undesirable cracking of liquid constituents and separating the light cracked products by delivering the heated oil into an enlarged chamber where no substantial accumulation of liquid oil is permitted, the residual oil being rapidly discharged therefrom and from the cracking system to prevent accumulation of liquid in said chamber, removing the vapors from said chamber, separating out the heavier constituents thereof by partial condensation, expanding the discharged residual oil at low pressure into a flash chamber to vaporize the lighter constituents by the contained heat of the oil, withdrawing the heavier bottoms from the flash chamber, mixing fresh charging stock with overhead products from the flash chamber, preheating said mixture, and introducing the preheated mixture and the hot condensate from said initial partial condensation into the coil to be heated therein.

16. A process of cracking oil which comprises heating to cracking temperature a stream of hydrocarbon charging oil, mixed only with clean condensate produced in the process, to the desired extent as it flows under pressure through a heating coil, delivering the efflux from said coil without material pressure reduction into an enlarged unheated chamber where vaporization takes place and accumulation of liquid is substantially prevented by the rapid and continuous discharge of residual oil therefrom at such a rate as to prevent said residual oil from remaining in the chamber for a sufficient length of time to permit the formation of carbon therein, reducing the pressure materially on the discharged residual oil and distilling it under its contained heat to leave a liquid residue, subjecting the vapors evolved in the enlarged vaporizing chamber to reflux condensation, and returning the condensate unmixed with residual oil to the heating coil for further cracking.

17. The process of cracking petroleum oil which comprises continuously passing the oil in a restricted stream through a zone wherein the oil is heated to a cracking temperature, thence delivering this restricted stream of oil constituents into an enlarged zone, continuously removing vapors and liquid oil from said enlarged zone without permitting the liquid oil so removed to mingle with the oil of said restricted stream, effecting the removal of the liquid oil at a rate adequate to prevent, during normal operation of the process, the accumulation of any appreciable body of oil in said enlarged zone, expanding the liquid oil thus removed into a flash chamber, and effecting distillation by means of the contained heat of said liquid under reduced pressure.

18. A process of cracking hydrocarbon oil which comprises heating the oil to cracking temperature as it flows under superatmospheric pressure through a heating coil, passing the oil thence into an enlarged reaction chamber maintained under superatmospheric pressure wherein separation of vapors and liquid occurs, removing the separated vapors, withdrawing liquid from said enlarged chamber at a rate adequate to prevent any substantial accumulation of liquid therein, expanding the liquid thus withdrawn into a flash chamber, and effecting distillation by means of the contained heat of said liquid under reduced pressure.

19. The process of cracking petroleum oil which comprises continuously passing the oil through a heating zone wherein the oil is heated to a cracking temperature, thence passing the heated oil to a reaction zone through which liquid oil passes in continuous flow and at such a rate that no substantial accumulation of liquid oil occurs therein, thence partially cooling the oil discharging from said reaction zone to substantially check the cracking reaction, passing the partially cooled oil at its reduced temperature immediately into a flash chamber, effecting vaporization and separation from the liquid oil, by latent heat distillation in the flash chamber, of a re-cycled stock, removing and condensing vapors liberated from the liquid oil in said flashed vapor, and returning condensate thus derived as a re-cycled stock to said heating zone.

LESTER KIRSCHBRAUN.